(12) United States Patent
Vogelaar et al.

(10) Patent No.: US 11,731,118 B2
(45) Date of Patent: Aug. 22, 2023

(54) SUPPORTED HYDROTREATING CATALYSTS HAVING ENHANCED ACTIVITY

(71) Applicant: ALBEMARLE CATALYSTS COMPANY B. V., Amsterdam (NL)

(72) Inventors: Bastiaan Maarten Vogelaar, Hoofddorp (NL); Jacob Arie Bergwerff, Amsterdam (NL); Johan van Oene, Zandvoort (NL); Henk Jan Tromp, Utrecht (NL)

(73) Assignee: ALBEMARLE CATALYSTS COMPANY B.V., Amsterdam (NL)

( * ) Notice: Subject to any disclaimer, the term of this patent is extended or adjusted under 35 U.S.C. 154(b) by 0 days.

(21) Appl. No.: 17/520,205

(22) Filed: Nov. 5, 2021

(65) Prior Publication Data

US 2022/0055026 A1    Feb. 24, 2022

Related U.S. Application Data (63) Continuation-in-part of application No. 14/430,146, filed as application No. PCT/EP2013/070826 on Oct. 7, 2013, now abandoned.
(Continued)

(51) Int. Cl.
*B01J 31/34* (2006.01)
*B01J 21/08* (2006.01)
(Continued)

(52) U.S. Cl.
CPC ............... *B01J 31/34* (2013.01); *B01J 21/04* (2013.01); *B01J 21/08* (2013.01); *B01J 31/28* (2013.01);
(Continued)

(58) Field of Classification Search
CPC . B01J 27/19; B01J 31/06; B01J 35/023; B01J 37/0203; B01J 37/0219; B01J 37/20;
(Continued)

(56) References Cited

U.S. PATENT DOCUMENTS 2,861,101 A    11/1958  Tousignant et al.
3,755,150 A    8/1973   Mickelson
(Continued)

FOREIGN PATENT DOCUMENTS

EP    1 600 212 A1    11/2005
EP    1 712 277 A1    10/2006
(Continued)

OTHER PUBLICATIONS

Haber, J., et al., "Manual Of Methods And Procedures For Catalyst Characterization", Pure & Appl. Chem., 1995., vol. 67, Nos. 8/9, pp. 1257-1306.
(Continued)

*Primary Examiner* — Brian A McCaig
(74) *Attorney, Agent, or Firm* — Mary H. Drabnis; R. Andrew Patty, II; Phelps Dunbar LLP (57) ABSTRACT

This invention provides supported catalysts comprising a carrier, phosphorus, at least one Group VI metal, at least one Group VIII metal, and a polymer. In the catalyst, the molar ratio of phosphorus to Group VI metal is about 1:1.5 to less than about 1:12, the molar ratio of the Group VI metal to the Group VIII metal is about 1:1 to about 5:1, and the polymer has a carbon backbone and comprises functional groups having at least one heteroatom. Also provided are a process for preparing such supported catalysts, as well as methods for hydrotreating, hydrodenitrogenation, and/or hydrodesulfurization, using supported catalysts.

12 Claims, 5 Drawing Sheets

Related U.S. Application Data (60) Provisional application No. 61/712,108, filed on Oct. 10, 2012.

(51) Int. Cl.

| | | |
|---|---|---|
| *B01J 21/04* | (2006.01) | |
| *B01J 35/02* | (2006.01) | |
| *B01J 37/02* | (2006.01) | |
| *B01J 37/08* | (2006.01) | |
| *B01J 31/28* | (2006.01) | |

(52) U.S. Cl.
CPC .......... *B01J 35/023* (2013.01); *B01J 37/0203* (2013.01); *B01J 37/08* (2013.01)

(58) Field of Classification Search
CPC ........... B01J 38/52; B01J 38/62; C10G 45/00; C10G 45/08
See application file for complete search history.

(56) References Cited

U.S. PATENT DOCUMENTS

| | | | |
|---|---|---|---|
| 3,872,030 | A | 3/1975 | Feins et al. |
| 3,904,685 | A | 9/1975 | Shahidi et al. |
| 3,966,996 | A * | 6/1976 | Andre .................. B01J 2/08 |
| | | | 423/628 |
| 3,992,324 | A | 11/1976 | Andre et al. |
| 3,993,592 | A | 11/1976 | Van Thillo et al. |
| 4,225,421 | A | 9/1980 | Hensley, Jr. et al. |
| 4,358,396 | A | 11/1982 | Bernstein et al. |
| 4,698,404 | A | 10/1987 | Cramm et al. |
| 5,232,888 | A | 8/1993 | Kamo |
| 5,990,245 | A | 11/1999 | Esselborn et al. |
| 6,280,610 | B1 | 8/2001 | Uragami et al. |
| 6,294,498 | B1 | 9/2001 | Darcissac et al. |
| 6,310,156 | B1 | 10/2001 | Maeda et al. |
| 6,989,348 | B2 | 1/2006 | Eijsbouts |
| 7,514,476 | B2 | 4/2009 | Parasher et al. |
| 7,534,741 | B2 | 5/2009 | Wu et al. |
| 7,541,309 | B2 | 6/2009 | Trevino et al. |
| 7,563,742 | B2 | 7/2009 | Reyes et al. |
| 7,718,710 | B2 | 5/2010 | Zhang et al. |
| 2002/0010089 | A1 | 1/2002 | Eijsbouts |
| 2002/0013223 | A1 | 1/2002 | Eijsbouts et al. |
| 2005/0014635 | A1 | 1/2005 | Zhou et al. |
| 2005/0261125 | A1 | 11/2005 | Sagae |
| 2005/0266985 | A1 | 12/2005 | Iwata |
| 2008/0119353 | A1 | 5/2008 | Jia et al. |
| 2008/0194892 | A1 | 8/2008 | Cholley et al. |
| 2009/0107883 | A1 | 4/2009 | Maesen et al. |
| 2010/0105540 | A1 | 4/2010 | Galliou et al. |
| 2010/0133148 | A1 | 6/2010 | Timmler et al. |
| 2012/0037540 | A1 | 2/2012 | Jansen et al. |
| 2013/0186806 | A1 | 7/2013 | Diehl et al. |

FOREIGN PATENT DOCUMENTS

| | | |
|---|---|---|
| FR | 2 451 221 | 10/1980 |
| GB | 2 150 852 A | 7/1985 |
| WO | 1999/48975 A1 | 9/1999 |
| WO | 2006/046254 A1 | 5/2006 |
| WO | 2010/121807 A1 | 10/2010 |
| WO | 2011/023668 A2 | 3/2011 |
| WO | 2012/022850 A2 | 2/2012 |
| WO | 2012/042479 A1 | 4/2012 |

OTHER PUBLICATIONS

Liu, L., et al., "Investigation of small molecular weight poly(acrylic acid) adsorption on xy-alumina", Applied Surface Science, 2015, vol. 345, pp. 116-121.

Wang, B., et al., "Formation of poly(acrylic acid)/alumina composite via in situ polymerization of acrylic acid adsorbed within oxide pores", Colloids and Surfaces, A: Physiochemical and Engineering Aspects, 2017, vol. 514, pp. 168-177.

Zaman, A., et al., "Adsorption of a Low-Molecular-Weight Polyacrylic Acid on Silica, Alumina, and Kaolin", Journal of Colloid and Interface Science, 2002, vol. 256, pp. 73-78.

Block, P.A. et al., "Novel Activation Technologies for Sodium Persulfate In Situ Chemical Oxidation", Preprint: Proceedings of the Fourth International Conference on the Remediation of Chlorinated and Recalcitrant Compounds, 2004, 8 pages.

Chibowski, Stanislaw, et al., "Polyacrylic Acid (PAA) Adsorption on Alumina (Al2O3) Surface. Influence of Sodium Dodecyl Sulfide (SDS) on Adsorption in PAA-SDS-Al2O3 System", Physicochemical Problems of Mineral Processing, 2006, vol. 40, pp. 175-184.

Li, Zhonghui, et al., "A hybrid supported nickel catalyst for the controlled radical polymerization of methyl methacrylate", Applied Catalysis A: General, 2005, 292, pp. 61-67.

Murli, C., et al., "Pressure-Induced Polymerization of Acrylic Acid: A Raman Spectroscopic Study", J. Phys. Chem. B, 2010, 114, pp. 9744-9750.

Rivas, B.L., et al., "Poly(acrylic acid-co-vinylsulfonic acid): Synthesis, characterization, and Properties as Polychelatogen", Journal of Applied Polymer Science, 2003, vol. 88, pp. 1698-1704.

Rivas, B.L., et al., "Polymer-metal complexes: Synthesis, characterization, and properties of poly(maleic acid) metal complexes with Cu(II), Co(II), Ni(II), and Zn(II)", Polymer Bulletin, 2000, 44, pp. 445-452.

Yang, C. Q., et al., "Polymerization of Maleic Acid and Itaconic Acid Studied by FT-Raman Spectroscopy", Journal of Applied Polymer Science, 2001, vol. 81, pp. 223-228.

Das, K. K., et al., "Ultra-low dosage flocculation of alumina using polyacrylic acid", Colloids and Surfaces, A: Physicochemical and Engineering Aspects, 2001, 182, pp. 25-33.

* cited by examiner

Fig. 3-5

SUPPORTED HYDROTREATING CATALYSTS HAVING ENHANCED ACTIVITY

REFERENCE TO RELATED APPLICATIONS

This application is a continuation-in-part of U.S. patent application Ser. No. 14/430,146, filed on Mar. 20, 2015, which in turn is the National Stage of International Patent Appl. No. PCT/EP2013/070826, filed on Oct. 7, 2013, which in turn claims the benefit of U.S. Provisional Patent Appl. No. 61/712,108, filed on Oct. 10, 2012, the disclosures of which are incorporated herein by reference.

TECHNICAL FIELD

This invention relates to supported catalysts formed from concentrated solutions comprising a Group VI metal, a Group VIII metal, and phosphorus.

BACKGROUND

A variety of catalysts for hydrotreating, hydrodesulfurization, and/or hydrodenitrogenation are known and/or are commercially available. Many of these catalysts, some of which contain molybdenum, nickel or cobalt, and phosphorus, are supported on carriers, and are usually prepared by pore volume impregnation. The art continually strives to make different and better catalysts, especially with higher activities for hydrotreating, hydrodesulfurization, and/or hydrodenitrogenation.

Hydroprocessing catalysts are typically prepared by impregnation of a porous carrier material with a solution containing active metals, followed by either drying or calcination. Calcined catalysts tend to exhibit a strong metal-support interaction, which results in a high metal dispersion. However, it is theorized that strong metal-support interaction in calcined catalysts results in a lower intrinsic activity of the catalyst. Non-calcined catalysts typically show a low metal-support interaction and an intrinsically high activity. Due to the low metal-support interaction in non-calcined catalysts, the metals tend to aggregate (poor metal dispersion).

SUMMARY OF THE INVENTION

This invention provides processes for preparing supported catalysts from concentrated solutions comprising Group VI metal, Group VIII metal, and phosphorus, and catalysts prepared by such processes. Catalysts prepared according to the invention exhibit high activity in hydrodesulfurization and hydrodenitrification. It has been suggested that in the catalysts of the invention, which are polymer-modified, the hydrogenation metals are more dispersed than in similar catalysts in absence of polymer modification.

An embodiment of this invention is a supported catalyst. The supported catalyst comprises a carrier, phosphorus, at least one Group VI metal, at least one Group VIII metal, and a polymer. In the catalyst, the molar ratio of phosphorus to Group VI metal is about 1:1.5 to less than about 1:12, the molar ratio of the Group VI metal to the Group VIII metal is about 1:1 to about 5:1. The polymer in the catalyst has a carbon backbone and comprises functional groups having at least one heteroatom.

Other embodiments of this invention include processes for forming the just-described supported catalysts, as well as methods for hydrotreating, hydrodenitrogenation, and/or hydrodesulfurization, using the just-described supported catalysts.

These and other embodiments and features of this invention will be still further apparent from the ensuing description, drawings, and appended claims.

BRIEF DESCRIPTION OF THE DRAWINGS

FIGS. 3-1 to 3-5 show cross sections from SEM-EDX measurements of catalyst particles prepared as in Examples 14 and 15.

FURTHER DETAILED DESCRIPTION OF THE INVENTION

Throughout this document, the phrases "hydrogenation metal" and "hydrogenation metals" refer to the Group VI metal or metals and the Group VIII metal or metals collectively. As used throughout this document, the term "Group VI metal" refers to the metals of Group VIB. As used throughout this document, the phrases "as the Group VI metal trioxide," "reported as the Group VI metal trioxide," "calculated as the Group VI metal trioxide," "expressed as their oxides," and analogous phrases for the Group VIII metals as their monoxides and phosphorus as phosphorus pentoxide ($P_2O_5$) refer to the amount or concentration of Group VI metal, Group VIII metal, or phosphorus, where the numerical value is for the respective oxide, unless otherwise noted. For example, nickel carbonate may be used, but the amount of nickel is stated as the value for nickel oxide.

The impregnation solutions used in the practice of this invention comprise a polar solvent, phosphorus, at least one Group VI metal, and at least one Group VIII metal, where the molar ratio of phosphorus to Group VI metal is about 1:1.5 to less than about 1:12, and where the molar ratio of the Group VI metal to the Group VIII metal is about 1:1 to about 5:1.

The Group VI metal is molybdenum, tungsten, and/or chromium; preferably molybdenum or tungsten, more preferably molybdenum. The Group VIII metal is iron, nickel and/or cobalt, preferably nickel and/or cobalt. Preferred mixtures of metals include a combination of nickel and/or cobalt and molybdenum and/or tungsten. When hydrodesulfurization activity of the catalyst is to be emphasized, a combination of cobalt and molybdenum is advantageous and preferred. When hydrodenitrogenation activity of the catalyst is to be emphasized, a combination of nickel and molybdenum and/or tungsten is advantageous and preferred. Another preferred combination of hydrogenation metals is nickel, cobalt and molybdenum.

The Group VI metal compound can be an oxide, an oxo-acid, or an ammonium salt of an oxo or polyoxo anion; these Group VI metal compounds are formally in the +6 oxidation state when the metal is molybdenum or tungsten. Oxides and oxo-acids are preferred Group VI metal compounds. Suitable Group VI metal compounds in the practice of this invention include chromium(III) oxide, ammonium chromate, ammonium dichromate, molybdenum trioxide, molybdic acid, ammonium molybdate, ammonium paramolybdate, tungsten trioxide, tungstic acid, ammonium metatungstate hydrate, ammonium para-tungstate, and the like. Preferred Group VI metal compounds include chromium(III) oxide, molybdenum trioxide, molybdic acid, ammonium para-tungstate, tungsten trioxide and tungstic acid. Mixtures of any two or more Group VI metal compounds can be used.

The Group VIII metal compound is usually an oxide, carbonate, hydroxide, or a salt. Suitable Group VIII metal compounds include, but are not limited to, iron oxide, iron hydroxide, iron nitrate, iron carbonate, iron hydroxy-carbonate, iron acetate, iron citrate, cobalt oxide, cobalt hydroxide, cobalt nitrate, cobalt carbonate, cobalt hydroxy-carbonate, cobalt acetate, cobalt citrate, nickel oxide, nickel hydroxide, nickel nitrate, nickel carbonate, nickel hydroxy-carbonate, nickel acetate, and nickel citrate. Preferred Group VIII metal compounds include iron hydroxide, iron carbonate, iron hydroxy-carbonate, cobalt hydroxide, cobalt carbonate, cobalt hydroxy-carbonate, nickel hydroxide, nickel carbonate, and nickel hydroxy-carbonate. Mixtures of two or more Group VIII metal compounds can be used.

In the practice of this invention, the phosphorus compound is soluble in a polar solvent, and is typically an acidic phosphorus compound, preferably a water soluble acidic phosphorus compound, particularly an oxygenated inorganic phosphorus-containing acid. Examples of suitable phosphorus compounds include metaphosphoric acid, pyrophosphoric acid, phosphorous acid, orthophosphoric acid, triphosphoric acid, tetraphosphoric acid, and precursors of acids of phosphorus, such as ammonium hydrogen phosphates. Mixtures of two or more phosphorus compounds can be used. The phosphorus compound may be used in liquid or solid form. In some embodiments, the phosphorus compound is preferably a water-soluble compound. A preferred phosphorus compound is orthophosphoric acid ($H_3PO_4$).

In this invention, the polar solvent can be protic or aprotic, and is generally a polar organic solvent and/or water. Mixtures of polar solvents can be used, including mixtures comprising an aprotic solvent and a protic solvent. Suitable polar solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, and mixtures thereof. Preferably, the polar solvent is a protic solvent; more preferably, the polar solvent is water or an alcohol, such as ethanol or isopropyl alcohol. Water is a preferred polar solvent.

When a monomer and a carrier are brought together and the monomer is polymerized before being contacted with an impregnation solution, only the monomer needs to be soluble in the polar solvent used prior to polymerization. It is preferred to employ the same polar solvent to dissolve the monomer and to form the impregnation solution, although different solvents can be used if desired. When an impregnation solution and a carrier are brought together to form an impregnated carrier prior to contact with the monomer, the monomer needs to be soluble in a polar solvent that may be the same or different than the polar solvent of the impregnation solution; use of the same polar solvent to dissolve the monomer and to form the impregnation solution is preferred, although different solvents can be used if desired.

Polar solvents that form impregnation solutions must be able to dissolve the phosphorus compounds, Group VI metal compounds, and Group VIII metal compounds that are used in forming the impregnation solutions used in the practice of this invention.

When a monomer species and at least one phosphorus compound, at least one Group VI metal compound, at least one Group VIII metal compound are brought together prior to polymerization, the monomer species should be soluble in the solution containing a polar solvent, phosphorus, at least one Group VI metal compound, and at least one Group VIII metal compound. Generally, this solubility property for the monomer species is similar to the solubility of the monomer species in the polar solvent without at least one phosphorus compound, at least one Group VI metal compound, and at least one Group VIII metal compound in solution. When an impregnation solution is brought into contact with the carrier and monomer species during polymerization, the same solubility considerations apply; namely, that the monomer species present should be soluble in the polar solvent in the presence of the at least one phosphorus compound, at least one Group VI metal compound, and at least one Group VIII metal compound.

Throughout this document, the term "monomer" is synonymous with the phrase "monomer species." The monomer species has carbon-carbon unsaturation as the polymerizable moiety, and at least one functional group comprising at least one heteroatom. It is theorized that the heteroatom(s) may form a bond or interaction with a metal ion, though formation of bonds or interactions is not required. Preferred monomers include functional groups which have one or more lone pairs of electrons. Preferably, the functional group of the monomer species comprises nitrogen, oxygen, phosphorus, and/or sulfur. Examples of suitable functional groups include hydroxyl groups, carboxyl groups, carbonyl groups, amine groups, amide groups, nitrile groups, amino acid groups, phosphate groups, thiol groups, sulfonic acid groups, and the like. Preferred functional groups include hydroxyl groups and carboxyl-containing groups, especially carboxylic acid groups, ester groups, amido groups, and hydroxyl groups; more preferred are carboxylic acid groups.

Thus, suitable monomer species include acrylic acid, maleic acid, fumaric acid, crotonic acid, pentenoic acid, methacrylic acid, 2,3-dimethacrylic acid, 3,3-dimethacrylic acid, allyl alcohol, 2-sulfoethyl methacrylate, n-propyl acrylate, hydroxymethyl acrylate, 2-hydroxyethyl acrylate, 2-carboxyethyl acrylate, 3-ethoxy-3-oxopropyl acrylate, methylcarbamylethyl acrylate, 2-hydroxyethyl methacrylate, N-vinylpyrrolidone, acrylamide, methacrylamide, N-isopropylacrylamide, N-vinylacetamide, N-vinyl-N-methylacetamide, N-hydroxymethyl acrylamide, N-hydroxyethyl acrylamide, N-methoxymethyl acrylamide, N-ethoxymethyl acrylamide, vinyl sulfate, vinyl sulfonic acid, 2-propene-1-sulfonic acid, vinyl phosphate, vinyl phosphonic acid, dimethyl allyl phosphate, diethyl allyl phosphate, and the like. Preferred monomer species include acrylic acid, maleic acid, 2-carboxyethyl acrylate, and N-hydroxyethyl acrylamide, particularly acrylic acid. Mixtures of two or more monomer species can be employed.

The amount of monomer used to form the catalysts of this invention is expressed as wt % relative to the total weight of the other components used to form the catalyst, excluding the polar solvent. As used throughout this document, the phrases "other components used to form the catalyst" and "other catalyst components" refer to the carrier and the chemical substances that provide the hydrogenation metals and phosphorus to the catalyst. For example, if the total weight of the other components of the catalyst (other than the polar solvent) is 100 grams, 10 wt % of monomer is 10 grams. In the practice of this invention, the amount of monomer is generally about 1.5 wt % or more, preferably in the range of about 1.5 wt % to about 35 wt %, relative to the total weight of the other components of the catalyst excluding the polar solvent, although amounts outside these ranges are within the scope of the invention. More preferably, the amount of monomer is in the range of about 3 wt % to about 27 wt %, and even more preferably in the range of about 5 wt % to about 20 wt % relative to the total weight of the other components of the catalyst excluding the polar solvent.

An inhibitor (e.g., a radical scavenger) can be included with the monomer to prevent premature polymerization of the monomer species. Suitable inhibitors will vary with the particular monomer(s). Appropriate inhibitors will not have an adverse effect on the at least one phosphorus compound, at least one Group VI metal compound, and at least one Group VIII metal compound, when present in the mixture before polymerization is initiated. Desirably, the inhibitor is neutralized or removed (e.g., by evaporation or introduction of an initiator) when it is desired to start the polymerization reaction.

Although the components used in forming an impregnation solution can be combined in any order, it is recommended and preferred that one component is suspended or dissolved in the polar solvent prior to the introduction of the other components. Preferably, the Group VIII metal compound is introduced first; more preferably, the Group VI metal compound is introduced after the Group VIII metal compound. The phosphorus compound may be introduced at any point, but preferably is introduced after the Group VI compound and the Group VIII compound have been introduced. Stirring may be employed when forming the solution, but can be stopped once the solution is homogeneous. Similar considerations apply when a monomer and at least one phosphorus compound, at least one Group VI metal compound, and at least one Group VIII metal compound are brought together; it is preferable to combine the compounds of the hydrogenation metals with the polar solvent, then add the phosphorus compound, followed by the monomer.

Combining of the components of an impregnation solution can be done at ambient conditions, i.e., room temperature and ambient pressure. Elevated temperatures are sometimes necessary to assist in the dissolution of the components, particularly the Group VI compound and the Group VIII compound. Such elevated temperatures are typically in the range of about 50° C. to about 95° C., preferably about 60° C. to about 95° C. Temperatures in excess of about 95° C. and/or elevated pressures can be applied (e.g., hydrothermal preparation), but are not required. If a monomer for which polymerization is thermally initiated is to be included in the solution, either the temperature to which the solution is heated is kept below the temperature at which polymerization is initiated, or, preferably, the monomer species is added after any heating of the solution is completed.

It is convenient to prepare solutions having concentrations that are practical for further intended use of the solution. These solutions can be employed, as embodied in this invention, to form a supported catalyst. Suitable concentrations based on the Group VI metal (or total thereof, if more than one Group VI metal is present in the composition), are typically in the range of about 1.39 mol/L to about 6 mol/L, preferably in the range of about 2.1 mol/L to about 4.2 mol/L.

Methods for preparing more-concentrated impregnation solutions are known, and are described for example in International Publication No. WO 2011/023668.

The impregnation solutions for the invention, formed as described above, are solutions comprising a Group VI metal, a Group VIII metal, and phosphorus, in a polar solvent. The concentrations of the Group VI metal, Group VIII metal, phosphorus and, and the preferences therefor are as described above. In these solutions, the molar ratio of phosphorus to Group VI metal is about 1:1.5 to less than about 1:12, preferably about 1:2.5 to less than about 1:12, and the molar ratio of the Group VI metal to the Group VIII metal is about 1:1 to about 5:1.

Without wishing to be bound by theory, a mixture of species is believed to be present in the impregnation solutions for this invention. At this time, not all of the species are well characterized. In this connection, for examples of species present in solutions containing molybdenum and phosphorus, see J. Bergwerff, Ph.D. thesis, Utrecht University, The Netherlands, 2007, Chapter 2C.

When mixtures of reagents are used in forming the solutions, as mentioned above, a mixture of species having different metals will be present in the solution. For example, if a molybdenum compound and a tungsten compound are used, the product solution will include molybdenum and tungsten. In another example, if a cobalt compound and a nickel compound are used, the solution will include cobalt and nickel. Mixtures of reagents such that Group VI metal compounds in which the Group VI metals of the compounds are different and Group VIII metal compounds in which the Group VIII metals of the compounds are different can be used in forming the solution compositions if desired.

The processes of the invention for forming catalysts comprise I) bringing together a carrier, one or more monomer species, a polar solvent, at least one phosphorus compound, at least one Group VI metal compound, and at least one Group VIII metal compound, and optionally an initiator, in any of the following combinations:

a carrier, one or more monomer species, a polar solvent, and optionally an initiator, a carrier, one or more monomer species, at least one phosphorus compound, at least one Group VI metal compound, and at least one Group VIII metal compound, and optionally an initiator, or a carrier and an impregnation solution, forming an impregnated carrier, followed by mixing the impregnated carrier with one or more monomer species and optionally an initiator, to form a monomer-containing mixture, where said monomer species is soluble in the polar solvent and has carbon-carbon unsaturation and at least one functional group comprising at least one heteroatom. Step II) comprises polymerizing the monomer species in the monomer-containing mixture to form a polymerized product. Step III) is performed when I) does not include at least one phosphorus compound, at least one Group VI metal compound, and at least one Group VIII metal compound, and comprises either contacting an impregnation solution and the monomer-containing mixture during the polymerizing in II), or contacting the polymerized product and an impregnation solution.

A supported catalyst is formed. In the processes, the molar ratio of phosphorus to Group VI metal is about 1:1.5 to less than about 1:12, where the molar ratio of the Group VI metal to the Group VIII metal is about 1:1 to about 5:1. Impregnation solutions employed in the process comprise a polar solvent, phosphorus, at least one Group VI metal, and at least one Group VIII metal. Removal of excess solvent from the supported catalyst, e.g., by drying, is a recommended further step.

A feature of this invention is that there is no aggregation of carrier particles in the processes of the invention for forming catalysts. In other words, the carrier particles are unaltered in size and shape by the processes of the invention for forming catalysts. For example, carrier particles with an average particle size of about 2 mm become catalyst particles with an average particle size of about 2 mm.

In the processes of the invention for forming catalysts, all of the components in the impregnation solution must be dissolved before initiating the impregnation step. When at least one phosphorus compound, at least one Group VI metal compound, and at least one Group VIII metal compound form part of the monomer-containing mixture, the monomer species is preferably combined with the mixture after any heating of the mixture is finished. For monomers of thermally-initiated polymerizations, the temperature during formation of the monomer-containing mixtures are kept below the initiation temperature for polymerization.

The monomer-containing mixture includes at least one carrier and at least one monomer species. At least one phosphorus compound, at least one Group VI metal compound, and at least one Group VIII metal compound, or an impregnation solution are optionally included with the carrier and one or more monomer species in forming the monomer-containing mixture. Inclusion of the at least one phosphorus compound, at least one Group VI metal compound, and at least one Group VIII metal compound (sometimes as an impregnation solution) in the monomer-containing mixture is recommended and preferred. When at least one phosphorus compound, at least one Group VI metal compound, and at least one Group VIII metal compound (sometimes as an impregnation solution) are not included in the monomer-containing mixture, an impregnation solution can be mixed with the polymerized product of the monomer-containing solution; alternatively, an impregnation solution can be brought into contact with the monomer-containing mixture during polymerization.

In the processes of this invention, the polymerization of the monomer species to form the polymer typically employs at least one initiator. Initiators include heat, radiation (e.g., UV), chemical substances, and combinations of these. When the initiator is a chemical substance, it usually remains with the supported catalyst, and may affect catalyst performance. Thus, when more than one initiator can be chosen, it may be useful to run tests to determine which combination of initiator(s) and selected monomer(s) allows for optimal catalyst performance. Another consideration is that the selected initiator(s) and monomer(s) should not adversely affect the solubility of the phosphorus, Group VI metal, and/or Group VIII metal compounds in the impregnation solution (e.g., by causing precipitation). For example, in the polymerization of acrylic acid with persulfate salts as initiators, it was found that potassium persulfate was a better initiator than ammonium persulfate for a catalyst containing nickel, molybdenum, and phosphorus. The effect of a particular initiator may vary with the concentration of hydrogenation metals present in the catalyst, the monomer, and the conditions under which catalysis is performed.

Suitable initiators also depend on the (polymerization) reactivity of the selected monomer(s). For example, ammonium persulfate or potassium persulfate in combination with an increase in temperature from room temperature to 80° C. is a suitable combination of initiators for polymerization of acrylic acid. However, for monomers that polymerize less readily, a different type of initiator or a different combination of initiators may be required.

As used throughout this document, the term "carrier" is used to mean a catalyst support, and the term "carrier" can be used interchangeably with the term "support". Throughout this document, the term "carrier" refers to a carrier which is in the solid form or is pre-shaped. Such a carrier remains predominantly in the solid form when contacted with a polar solvent. The term does not refer to precursor salts, such as sodium aluminate, which dissolve almost completely in a polar solvent. The carrier is generally an inorganic oxide which is a particulate porous solid, and the carrier may be composed of conventional oxides, e.g., alumina, silica, silica-alumina, alumina with silica-alumina dispersed therein, alumina-coated silica, silica-coated alumina, magnesia, zirconia, boria, and titania, as well as mixtures of these oxides. Suitable carriers also include transition aluminas, for example an eta, theta, or gamma alumina. Preferred carriers include silica, alumina, silica-alumina, alumina with silica-alumina dispersed therein, alumina-coated silica, or silica-coated alumina, especially alumina or alumina containing up to about 20 wt % of silica, preferably up to about 12 wt % of silica. A carrier containing a transition alumina, for example an eta, theta, or gamma alumina, is particularly preferred, and a gamma-alumina carrier is most preferred.

The carrier is normally employed in a conventional manner in the form of spheres or, preferably, extrudates. Examples of suitable types of extrudates have been disclosed in the literature; see for example U.S. Pat. No. 4,028,227. Highly suitable for use are cylindrical particles (which may or may not be hollow) as well as symmetrical and asymmetrical polylobed particles (2, 3 or 4 lobes). Carrier particles are typically calcined at a temperature in the range of about 400° to about 850° C. before use in forming the catalysts of this invention.

Although particular pore dimensions are not required in the practice of this invention, the carrier's pore volume (measured via $N_2$ adsorption) will generally be in the range of about 0.25 to about 1 mL/g. The specific surface area will generally be in the range of about 50 to about 400 $m^2/g$, preferably about 100 to about 300 $m^2/g$ (measured using the BET method). Generally, the catalyst will have a median pore diameter in the range of about 7 nm to about 20 nm, preferably in the range of about 9 nm to about 20 nm, as determined by $N_2$ adsorption. Preferably, about 60% or more of the total pore volume will be in the range of approximately 2 nm from the median pore diameter. The figures for the pore size distribution and the surface area given above are determined after calcination of the carrier at about 500° C. for one hour.

The carrier particles typically have an average particle size of about 0.5 mm to about 5 mm, more preferably about 1 mm to about 3 mm, and still more preferably about 1 mm to about 2 mm. Because the size and shape of the carrier is not altered by the process for forming the catalyst, the catalyst generally has an average particle size of about 0.5 mm to about 5 mm, more preferably about 1 mm to about 3 mm, and still more preferably about 1 mm to about 2 mm.

The amount of carrier used to form the catalysts of this invention is about 40 wt % to about 80 wt %, preferably about 50 wt % to about 70 wt %, and more preferably about 60 wt % to about 70 wt %, relative to the total weight of the carrier, hydrogenation metals, and phosphorus, where the hydrogenation metals and phosphorus are expressed as their oxides, i.e., excluding the polar solvent and the monomer species.

Methods for impregnating the carrier are known to the skilled artisan. Preferred methods include co-impregnation of at least one phosphorus compound, at least one Group VI metal compound, and at least one Group VIII metal compound. In the processes of this invention for forming catalysts, only one impregnation step is needed. In a single impregnation step, once the carrier and impregnation solution are brought together, the mixture is usually homogenized until virtually all of the impregnation solution is taken up into the catalyst. In this technique, which is known in the art as pore volume impregnation or as incipient wetness impregnation, the impregnation solution will be taken up virtually completely by the pores of the catalyst, which makes for an efficient use of chemicals, and avoids dust in the product.

There can be a wide number of variations on the impregnation method. Thus, it is possible to apply a plurality of impregnating steps, the impregnating solutions to be used containing one or more of the component precursors that are to be deposited, or a portion thereof (sequential impregnation). Instead of impregnating techniques, there can be used dipping methods, spraying methods, and so forth. When carrying out multiple impregnation, dipping, etc., steps, drying may be carried out between impregnation steps. However, a single impregnation step is preferred because it is a faster, simpler process, allowing for a higher production rate, and is less costly. Single impregnation also tends to provide catalysts of better quality.

When the at least one phosphorus compound, at least one Group VI metal compound, and at least one Group VIII metal compound form part of the monomer-containing mixture, polymerization of the monomer species is preferably performed after the impregnation step, although polymerization can be started during impregnation of the carrier. If polymerization is carried out after impregnation, polymerization can be performed before or during removal of excess solvent if excess solvent removal is performed; preferably, polymerization is performed during removal of excess solvent. Similarly, when an impregnation solution and a carrier are brought together to form an impregnated carrier which is then mixed with a monomer, polymerization is preferably performed during removal of excess solvent, if excess solvent removal is performed.

In the processes of this invention, polymerization is carried out in the usual manner, by exposing the monomer species to an initiator in an amount suitable to polymerize at least a portion of the monomer. When present, any inhibitor needs to be inactivated when starting the polymerization reaction.

When at least one phosphorus compound, at least one Group VI metal compound, and at least one Group VIII metal compound do not form part of the monomer-containing mixture, polymerization is initiated in the presence of the carrier before impregnation, and an impregnation solution is combined with the monomer-containing mixture during polymerization or after polymerization has ended.

Examples of polymers formed as part of the catalysts of the invention include, but are not limited to, polyacrylic acid, polymaleic acid, polyfumaric acid, polycrotonic acid, poly(pentenoic) acid, polymethacrylic acid, polydimethacrylic acid, poly(allyl alcohol), poly(2-sulfoethyl)methacrylate, poly(n-propyl)acrylate, poly(hydroxymethyl)acrylate, poly(2-hydroxyethyl)acrylate, poly(2-carboxyethyl)acrylate, poly(3-ethoxy-3-oxopropyl)acrylate, poly(methylcarbamylethyl)acrylate, poly(2-hydroxyethyl)methacrylate, polyvinylpyrrolidone, polyacrylamide, polymethacrylamide, poly(N-isopropyl)acrylamide, polyvinylacetamide, polyvinyl-N-methylacetamide, poly(N-hydroxymethyl)acrylamide, poly(N-hydroxyethyl)acrylamide, poly(N-methoxymethyl)acrylamide, poly(N-ethoxymethyl)acrylamide, polyvinyl sulfate, polyvinyl sulfonic acid, poly(2-propyl)-1-sulfonic acid, polyvinyl phosphate, polyvinyl phosphonic acid, poly(dimethyl allyl phosphate), poly(diethyl allyl phosphate), polyvinyl phosphonic acid, and the like. As noted above, mixtures of two or more monomer species can be employed, and will form co-polymers.

Although the monomers used to form the supported catalyst will often be soluble in a polar solvent such as water, the polymer formed from the monomer(s) does not need to be soluble in water or other polar solvents.

The processes of the present invention yield supported catalysts in which the Group VIII metal is usually present in an amount of about 1 to about 10 wt %, preferably about 3 to about 8.5 wt %, calculated as a monoxide. In these catalysts, phosphorus is usually present in an amount of about 0.5 to about 10 wt %, more preferably about 1 to about 9 wt %, calculated as $P_2O_5$. When the Group VI metal in the catalyst is molybdenum, it will usually be present in an amount of about 35 wt % or less, preferably in an amount of about 15 to about 35 wt %, calculated as molybdenum trioxide.

When at least one phosphorus compound, at least one Group VI metal compound, and at least one Group VIII metal compound, or an impregnation solution are included before or during polymerization, a supported catalyst is obtained at the end of the polymerization step. If instead a polymerized product is formed and then contacted with an impregnation solution after polymerization, a supported catalyst is obtained at the end of the impregnation step or steps.

Optionally, excess solvent is removed from the supported catalyst. Removal of excess solvent may be carried out in air, under vacuum, or in the presence of an inert gas. Solvent removal is preferably achieved by drying the supported catalyst. Drying of the supported catalyst is conducted under such conditions that at least a portion of the polymer remains in the catalyst, i.e., the polymer is not completely removed by decomposition. Thus, the drying conditions to be applied depend on the temperature at which the particular polymer decomposes; decomposition can include combustion when the drying is conducted in the presence of oxygen. In these processes of the invention, drying should be carried out under such conditions that about 50% or more, preferably about 70% or more, more preferably about 90% or more, of the polymer is still present in the catalyst after drying. It is preferred to keep as much of the polymer as possible in the supported catalyst during drying; however, it is understood that loss of some of the polymer during the drying step cannot always be avoided, at least for more easily decomposed polymers. A drying temperature below about 270° C. may be necessary, depending on the polymer.

As mentioned above, the supported catalysts of this invention comprise a carrier, phosphorus, at least one Group VI metal, at least one Group VIII metal, and a polymer, where the molar ratio of phosphorus to Group VI metal is about 1:1.5 to less than about 1:12, the molar ratio of the Group VI metal to the Group VIII metal is about 1:1 to about 5:1, and the polymer has a carbon backbone and comprises functional groups having at least one heteroatom. The carriers and the preferences therefor are as described above. The carrier in the supported catalysts of this invention is in an amount of about 40 wt % to about 80 wt %, preferably about 50 wt % to about 70 wt %, and more preferably about 60 wt % to about 70 wt %, relative to the total weight of the carrier, hydrogenation metals, and phosphorus, where the hydrogenation metals and phosphorus are expressed as their oxides, i.e., excluding the polymer. The hydrogenation metals and the preferences therefor are as described above. In the polymers, the carbon backbone is sometimes referred to as a carbon-carbon backbone, where the backbone is the main chain of the polymer. Polymers in the supported catalysts and the preferences therefor are as described above.

Optionally, catalysts of the invention may be subjected to a sulfidation step (treatment) to convert the metal components to their sulfides. In the context of the present specification, the phrases "sulfiding step" and "sulfidation step" are meant to include any process step in which a sulfur-containing compound is added to the catalyst composition and in which at least a portion of the hydrogenation metal components present in the catalyst is converted into the sulfidic form, either directly or after an activation treatment with hydrogen. Suitable sulfidation processes are known in the art. The sulfidation step can take place ex situ to the reactor in which the catalyst is to be used in hydrotreating hydrocarbon feeds, in situ, or in a combination of ex situ and in situ to the reactor.

Ex situ sulfidation processes take place outside the reactor in which the catalyst is to be used in hydrotreating hydrocarbon feeds. In such a process, the catalyst is contacted with a sulfur compound, e.g., an organic or inorganic polysulfide or elemental sulfur, outside the reactor and, if necessary, dried, preferably in an inert atmosphere. In a second step, the material is treated with hydrogen gas at elevated temperature in the reactor, optionally in the presence of a feed, to activate the catalyst, i.e., to bring the catalyst into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulphiding agent, such as hydrogen sulfide or a compound which under the prevailing conditions is decomposable into hydrogen sulphide (e.g., dimethyl disulfide). It is also possible to use a hydrogen gas stream combined with a hydrocarbon feed comprising a sulfur compound which under the prevailing conditions is decomposable into hydrogen sulfide. In the latter case, it is possible to sulfide the catalyst by contacting it with a hydrocarbon feed comprising an added sulfiding agent such as dimethyl disulfide (spiked hydrocarbon feed), and it is also possible to use a sulfur-containing hydrocarbon feed without any added sulfiding agent, since the sulfur components present in the feed will be converted into hydrogen sulfide in the presence of the catalyst. Combinations of the various sulfiding techniques may also be applied. The use of a spiked hydrocarbon feed may be preferred.

When the catalyst is subjected to an in situ sulfidation step, the catalyst is exposed to high temperatures in the presence of oil and water formed during the process before sulfidation is complete. This exposure to high temperatures in the presence of oil and water does not appear to adversely affect catalyst activity. Without wishing to be bound by theory, it is thought that the polymer is more resistant to leaching or evaporation in comparison to catalysts described in the art that have low molecular weight organic additives.

The catalyst compositions of this invention are those produced by the above-described process, whether or not the process included an optional sulfiding step.

Without wishing to be bound by theory, both the observed greater dispersion of the hydrogenation metals and weak (low) metal-support interaction are achieved by employing monomers having functional groups as described above to form polymers in the supported catalysts. Such polymers are hypothesized to help disperse the hydrogenation metals throughout the pore network. Also without wishing to be bound by theory, hydrogenation metals are believed to interact with the polymer, which disperses the hydrogenation metals in the pore spaces of the support. It is also hypothesized that activation of the catalyst in a sulfiding atmosphere replaces at least some of the polymer's functional group heteroatoms with sulfur, which is believed to help minimize or prevent the hydrogenation metals from clustering together or interacting with the support, which minimized clustering and/or interacting with the support in turn is believed to contribute to the observed enhanced catalyst activity. In addition, it is theorized that the polymer (after sulfidation) may suppress sintering of the hydrogenation metals, contributing to improved stability of the supported catalyst.

The catalyst compositions of this invention can be used in the hydrotreating, hydrodenitrogenation, and/or hydrodesulfurization of a wide range of hydrocarbon feeds. Examples of suitable feeds include middle distillates, kero, naphtha, vacuum gas oils, heavy gas oils, and the like.

Methods of the invention are methods for hydrotreating, hydrodenitrogenation, and/or hydrodesulfurization of a hydrocarbon feed, which methods comprise contacting a hydrocarbon feed and a catalyst of the invention. Hydrotreating of hydrocarbon feeds involves treating the feed with hydrogen in the presence of a catalyst composition of the invention at hydrotreating conditions.

Conventional hydrotreating process conditions, such as temperatures in the range of about 250° to about 450° C., reactor inlet hydrogen partial pressures in the range of about 5 to about 250 bar (about $5 \times 10^5$ Pa to about $2.5 \times 10^7$ Pa), space velocities in the range of about 0.1 to about 10 vol./vol.hr, and $H_2$/feed ratios in the range of about 50 to about 2000 NL/L, can be applied.

As shown in the Examples, polymer loadings up to at least 18 wt % relative to the other catalyst components were achieved. The amount of polymer present in the supported catalyst (polymer loading) is defined similarly to the way the amount of monomer relative to the other catalyst components is defined above. In other words, the amount of polymer in the catalysts of this invention is expressed as wt % relative to the total weight of the other components used to form the catalyst excluding any polar solvent. For example, if the total weight of the other components of the catalyst is 100 grams, 10 wt % of polymer is 10 grams. In this invention, the polymer loading is generally about 1.5 wt % or more, preferably in the range of about 1.5 wt % to about 35 wt %, relative to the total weight of the other components in the catalyst, expressed as their oxides and excluding any polar solvent, although amounts outside these ranges are within the scope of the invention. When the polymer is polyacrylic acid, the amount of polymer is more preferably in the range of about 3 wt % to about 27 wt %, and even more preferably in the range of about 5 wt % to about 20 wt % relative to the total weight of the other components of the catalyst.

The following examples are presented for purposes of illustration, and are not intended to impose limitations on the scope of this invention.

In several Examples below, a carbon yield (C-yield) is reported. The carbon yield is defined as the % of carbon that was introduced into the sample via the monomer and was still present after drying of the materials.

In Tables 3, 5, 8, and 9 below, the catalyst activities are reported as the rate constants $k_{wt,HDS}$ and $k_{wt,HDN}$. For sulfur, the rate constant $k_{wt,HDS}$ was calculated using the following formula:

$$k_{wt,HDS} = WHSV * 1/(n-1) * (1/S^{n-1} - 1/S_0^{n-1})$$

where WHSV is the weight hourly space velocity ($g_{oil}/g_{cat}/h$); S is the percentage of sulfur in the product (ppm wt S);

$S_0$ is the percentage of sulfur in the feed (ppm wt S); and n is the reaction order of the hydrodesulfurisation reaction. For tests at 20 bar ($2.0 \times 10^6$ Pa) and 45 bar ($4.5 \times 10^6$ Pa), an n value of 1.4 was used. For testing at 90 bar ($9.0 \times 10^6$ Pa), an n value of 1.2 was used.

For nitrogen, the rate constant $k_{wt,HDN}$ was calculated using the following formula:

$$k_{wt,HDN} = WHSV * \ln(N_0/N)$$

where WHSV is the weight hourly space velocity ($g_{oil}/g_{cat}/h$); N is the percentage of nitrogen in the product (ppm wt N); and $N_0$ is the percentage of nitrogen in the feed (ppm wt N). The WHSV was calculated based on the catalyst weight after calcination in air at 600° C.

Example 1—Comparative

Polymerization of Monomer without Hydrogenation Metals

A solution was made by dissolving acrylic acid (AA; 1.8 g) in water (40 g). Ammonium persulfate (or peroxydisulfate, APS; 0.6 g) dissolved in water (2 g) was added to the solution. To start the polymerization reaction, the solution was heated to 70° C. with vigorous stirring. Upon reaching 70° C., the viscosity noticeably increased, and a clear gel was formed. The resulting gel was dried overnight at 120° C., yielding a white-yellow polymer film.

For Examples 2 and 3, a stock impregnation solution containing 90 g/L cobalt as CoO, 491 g/L molybdenum as $MoO_3$, and 37 g/L phosphorus as $P_2O_5$ was prepared by mixing together cobalt carbonate ($Co(OH)_x(CO_3)_y$), $MoO_3$, $H_3PO_4$ (aq., 85%), and water in appropriate amounts. The mixture was heated at temperatures above 70° C. until a clear solution was obtained. No monomer was present in this stock solution.

Example 2—Comparative

Polymerization of Monomer in Presence of Hydrogenation Metals

AA (1.58 g) was dissolved in 15 grams of the above stock solution with vigorous stirring. APS (0.35 g) dissolved in water (0.53 g) was then added to the solution. To initiate the polymerization reaction, the solution was heated to 70° C. with vigorous stirring. Upon reaching 70° C., the viscosity noticeably increased. Upon cooling, a rubbery mass was formed. The rubbery mass was dried overnight at 120° C., yielding a porous, brittle residue.

Example 3

Preparation of Polymer-Modified Catalyst Containing Co and Mo

A series of samples was made with varying quantities of acrylic acid (AA) in portions of the above-described stock solution. The quantity of ammonium persulfate (APS) was held constant in these samples. The amounts of the reagents are listed in Table 1; Run C1 is comparative, containing an initiator but no monomer. A quantity of the above stock solution was weighed into a round bottom flask. Acrylic acid was added, and the contents were mixed by swirling the flask. Ammonium persulfate (APS) was then added, and the contents were mixed by swirling the flask.

Extrudates of gamma-alumina having a surface area of 253 $m^2$/g were added to the solution for incipient wetness impregnation, and the contents were mixed by swirling the flask. The round bottom flask was placed on a rotary evaporator for 90 minutes with gentle rotation at room temperature. The temperature of the water bath was then raised to 80° C. to start the polymerization reaction (temperature was reached in 10 min.), and then the mixture was kept at 80° C. for 60 minutes; during this step, the system was closed to prevent evaporation. Then the polymer-modified impregnated extrudates obtained were transferred to a pan, dried with cold air, and then with hot air, to a product temperature of about 90° C.

The carbon content of the resulting catalysts was measured using total carbon analysis, and the carbon yields in grams and as percentage of the monomer carbon content are shown in Table 1.

TABLE 1

| | Run | | | | |
|---|---|---|---|---|---|
| | 1 | 2 | 3 | 4 | C1 |
| Alumina | 50.00 g | 50.00 g | 50.00 g | 50.00 g | 50.00 g |
| Stock soln. | 52.95 g | 52.95 g | 52.95 g | 52.95 g | 52.95 g |
| AA | 1.81 g | 3.60 g | 5.40 g | 7.20 g | 0.00 |
| APS | 0.15 g | 0.15 g | 0.15 g | 0.15 g | 0.15 g |
| $H_2O$ | 5.40 g | 3.60 g | 1.80 g | 0 | 7.20 g |
| Carbon | 0.90 g | 1.53 g | 2.28 g | 3.06 g | N/A |
| C-yield | 100% | 85% | 85% | 85% | N/A |

Example 4

Activity Testing of Catalysts Containing Co and Mo

The catalysts formed in Example 3 were ground; powder fractions of 125 to 350 µm were isolated by sieving. The 125 to 350 µm fractions were evaluated for their performance in hydrodesulfurization and hydrodenitrogenation. The catalysts were sulfided by contacting them with dimethyl disulfide (2.5 wt % S) spiked straight run gas oil (SRGO) in a two-step process with a temperature hold for 8 hours at 250° C. and 5 hours at 320° C. and 20 bar ($2.0 \times 10^6$ Pa) just prior to running the test.

The boiling point distribution of two straight run gas oil feeds, Feed A and Feed B, are shown in Table 2. Feed A contained 1.1678 wt % sulfur, 94.4 ppm of nitrogen, and had a density of 0.8366 g/mL.

TABLE 2

| | Feed A | Feed B | Feed C |
|---|---|---|---|
| Initial boiling point | 167° C. | 142° C. | 160° C. |
| 10 wt % | 205° C. | 197° C. | 245° C. |
| 20 wt % | 217° C. | 212° C. | 262° C. |
| 30 wt % | 241° C. | 235° C. | 276° C. |
| 40 wt % | 256° C. | 250° C. | 292° C. |
| 50 wt % | 269° C. | 265° C. | 306° C. |
| 60 wt % | 281° C. | 278° C. | 321° C. |
| 70 wt % | 294° C. | 291° C. | 338° C. |
| 80 wt % | 307° C. | 307° C. | 358° C. |
| 90 wt % | 323° C. | 325° C. | 382° C. |
| Final boiling point | 347° C. | 347° C. | 426° C. |

The samples were then tested for their performance in hydrodesulfurization and hydrodenitrogenation with straight run gas oil (SRGO) of Feed A. The samples were tested at 20 bar; the temperature was 345° C., the $H_2$ to oil ratio was 300 NL/L, and the weight hourly space velocity (WHSV) was in the range of 1.31 to 1.42/hour ($g_{oil}/g_{cat}$/h). The actual weight of catalyst in the different reactors, the applied WHSV, and the sulfur and nitrogen values in the liquid product samples are presented for the different catalysts in Table 3. Sulfur and nitrogen values were obtained by taking the average value of liquid product samples obtained between 1 and 9 days after introduction of Feed A. The HDS order used was 1.4.

Results are summarized in Table 3, which shows activity results of these runs using catalysts made according to Example 3 relative to comparative catalyst C1. The comparative catalyst contained cobalt, molybdenum, and phosphorus in amounts similar to the inventive catalysts tested, and the comparative catalyst was prepared in the presence of ammonium persulfate (initiator), but without a monomer present. As Table 3 shows, the hydrodesulfurization (HDS) and hydrodenitrogenation (HDN) activity increased up to about 14% as the amount of polyacrylic acid increased from 0% to about 8 wt %.

TABLE 3

| Run | Polymer loading* wt % | WHSV $g_{oil}/g_{cat}$/h | Test result S ppm | Test result N ppm | Activity $k_{wt,HDS}$ n = 1.4 | Activity $k_{wt,HDN}$ n = 1 |
|---|---|---|---|---|---|---|
| 1 | 2.4 | 1.39 | 64.6 | 35.6 | 0.65 | 1.35 |
| 2 | 4.1 | 1.31 | 48.8 | 31.3 | 0.69 | 1.45 |
| 3 | 6.1 | 1.42 | 57.8 | 34.1 | 0.70 | 1.45 |
| 4 | 8.2 | 1.42 | 50.1 | 32.8 | 0.74 | 1.50 |
| C1 | 0 | 1.39 | 65.9 | 36.5 | 0.65 | 1.32 |

Example 5

Preparation of Polymer-Modified Catalyst Containing Ni and Mo

A stock impregnation solution containing 100 g/L nickel as NiO, 599 g/L molybdenum as $MoO_3$, and 42 g/L phosphorus as $P_2O_5$ was prepared by mixing together nickel carbonate ($Ni(OH)_x(CO_3)_y$), $MoO_3$, $H_3PO_4$ (aq., 85%), and water in appropriate amounts. The mixture was heated at temperatures above 70° C. until a clear solution was obtained. No monomer was present in this stock solution.

The procedure of Example 3 was followed to prepare catalyst samples containing Ni, Mo, and P with acrylic acid, using the just-described stock solution, and an extruded alumina carrier having a surface area of either 205 m²/g or 271 m²/g. When ammonium persulfate (APS) was used as the initiator, a yellow deposit was formed. APS was replaced with potassium persulfate (KPS) by adding the same molar amount as APS. The amounts of the reagents are listed in Table 4; Runs C2 and C3 are comparative and contained the initiator but no monomer. The carbon content of the resulting catalysts was measured using total carbon analysis, and the carbon yields in grams and as percentage of the monomer carbon content are shown in Table 4.

TABLE 4

| | Run | | | | |
|---|---|---|---|---|---|
| | C2 | A | B | C | C3 |
| Alumina | 53.19 g | 53.19 g | 50.41 g | 50.41 g | 50.41 g |
| Surface area | 271 m²/g | 271 m²/g | 205 m²/g | 205 m²/g | 205 m²/g |
| Stock soln. | 45.93 g | 45.93 g | 45.93 g | 45.93 g | 45.93 g |
| AA | 0 g | 7.8 g | 7.8 g | 15.6 g | 0 g |
| KPS | 0.18 g | 0.18 g | 0.18 g | 0.18 g | 0.18 g |
| $H_2O$ | 15.6 g | 7.8 g | 8.06 g | 0 g | 15.86 g |
| Carbon | N/A | 3.20 g | 3.19 g | 6.86 g | N/A |
| C-yield | N/A | 82% | 82% | 88% | N/A |

Figure 1:
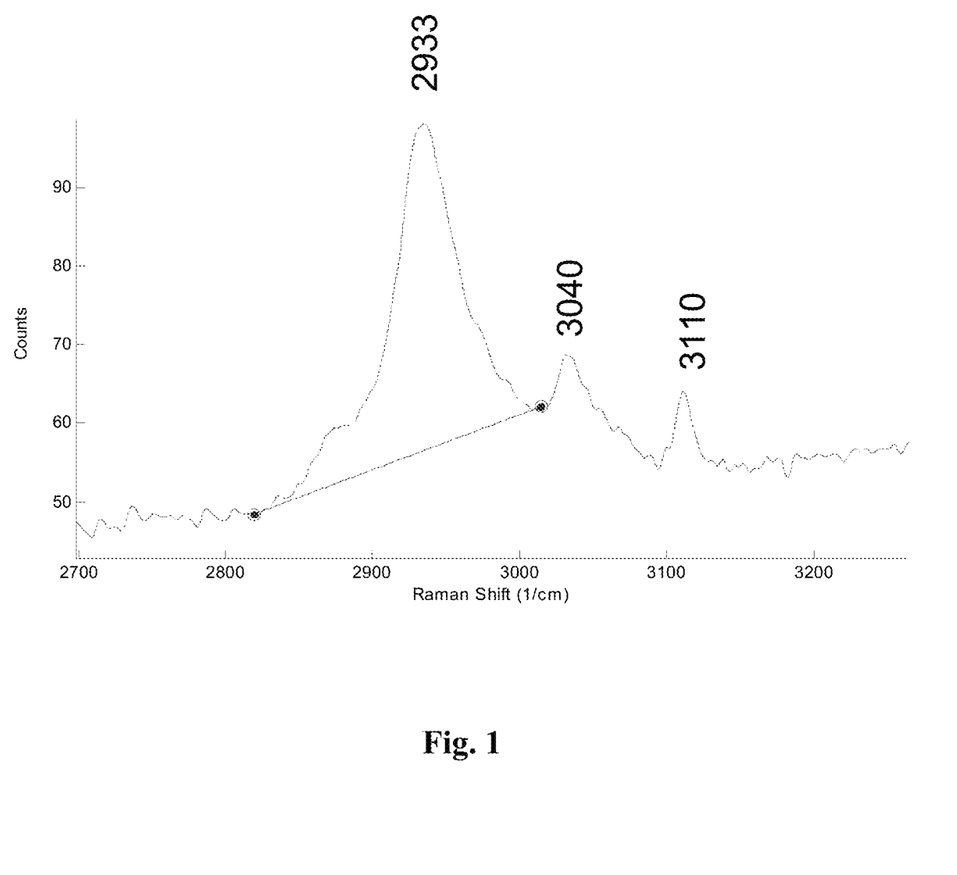
FIG. 1 shows a Raman spectrum providing evidence of polymerization in a catalyst prepared in Example 5.

Raman spectra of the catalysts prepared in Examples 3 and 5 show clear evidence that polymerization has occurred. The Raman measurements were performed at 532 nm excitation; the laser power was controlled to avoid sample damage. The spectra were recorded with a 10×30 second acquisition time. FIG. 1 shows a typical Raman spectrum obtained from catalyst B of Example 5 (Table 4). The spectrum shows an intense band around 2933 cm$^{-1}$, typical for polyacrylic acid. The bands at lower intensity around 3040 cm$^{-1}$ and 3110 cm$^{-1}$ are caused by the $\nu$(CH) and $\nu(CH_2)_{asy}$ vibrations, respectively, of the acrylic acid monomer. The high intensity of the 2933 cm$^{-1}$ peak relative to the 3040 cm$^{-1}$ and 3110 cm$^{-1}$ peaks clearly indicates that polymerization of the acrylic acid has taken place in this catalyst. For a validation of the assignments of different peaks, see for example, C. Murli and Y. Song, *Journal of Physical Chemistry B*, 2010, 114, 9744-9750.

Example 6

Activity Testing of Catalysts Containing Ni and Mo

There is a clear activity advantage for catalysts prepared with acrylic acid versus samples without any monomer (polymer). In this Example, activity testing of the catalysts prepared in Example 5 was carried out as described in Example 4, except that a different test feed was used, and the reactors were operated at 90 bar (9.0×10⁶ Pa) rather than 20 bar. The test feed was Feed B, which consisted of 50% light cycle oil (LCO) and 50% straight run gas oil (SRGO), and contained 1.1317 wt % sulfur, 277 ppm of nitrogen, and had a density of 0.8750 g/mL; the boiling point distribution of Feed B is in Table 2. The temperature was 308° C. for the HDN and 315° C. for the HDN test; the $H_2$ to oil ratio was 400 NL/L, and the weight hourly space velocity (WHSV) was in the range of 1.66-2.04/hour for the HDN test and 1.14-1.22/hour for the HDS test. The actual weight of catalyst in the different reactors, the applied WHSV, and sulfur and nitrogen values in the liquid product samples are presented for the different catalysts in Table 5. Sulfur and nitrogen values were obtained by taking the average value of liquid product samples obtained between 1 and 11 days after introduction of Feed B for the HDN test and between 14 and 22 days after introduction of Feed B for the HDS test. HDS data for comparative catalyst C3 were not generated due to a premature reactor shutdown. The HDS order used was 1.3.

Results are summarized in Table 5, which shows activity results for the catalysts made in this Example in comparison to the appropriate comparative catalyst. The hydrodesulfurization (HDS) activity and hydrodenitrogenation (HDN) activity increased up to about 20% as the amount of polyacrylic acid in the catalyst increased from 0% up to about 19 wt %.

TABLE 5

| Run | Carrier surf. area | Polymer loading* wt % | WHSV$_{HDN}$ g$_{oil}$/g$_{cat}$/h | WHSV$_{HDN}$ g$_{oil}$/g$_{cat}$/h | Test result S ppm | N ppm | Activity k$_{wt,HDS}$ n = 1.4 | k$_{wt,HDN}$ n = 1 |
|---|---|---|---|---|---|---|---|---|
| C2 | 271 m$^2$/g | 0 | 1.14 | 1.97 | 307 | 25.6 | 0.68 | 4.7 |
| A | 271 m$^2$/g | 8.3 | 1.22 | 1.98 | 324 | 18.3 | 0.72 | 5.4 |
| B | 205 m$^2$/g | 8.6 | 1.19 | 2.04 | 255 | 23.0 | 0.75 | 5.1 |
| C | 205 m$^2$/g | 18.6 | 1.15 | 1.95 | 173 | 15.5 | 0.82 | 5.6 |
| C3 | 205 m$^2$/g | 0 | N/A | 1.66 | N/A | 20.4 | N/A | 4.3 |

*Relative to the total weight of other components in the catalyst, excluding any polar solvent, and using observed carbon yield.

Example 7—Comparative

Polymerization of Various Monomers without Hydrogenation Metals Present

Several solutions, each with a different monomer and potassium persulfate (KPS) were prepared in water. The monomers, and the amounts of monomer, KPS, and water are listed in Table 6. Clear solutions were obtained by mixing all of the components at room temperature. Subsequently, each solution was heated in a closed vessel at 80° C. The change in appearance of each solution at elevated temperature was used to judge whether polymerization had occurred. Based on these observations, polymerization had occurred for all of the monomers tested except for ethylene glycol vinyl ether.

TABLE 6

| Monomer | Amt. monomer | Amt. water | Amt. KPS | Observation (above 50° C.) |
|---|---|---|---|---|
| Acrylic acid | 7.5 g | 22.2 g | 0.06 g | at 57° C. transparent gel |
| 2-Carboxyethyl acrylate | 7.5 g | 22.7 g | 0.06 g | at 75° C. gel; precipitation at cool down |
| Maleic acid | 7.1 g | 24.8 g | 0.05 g | precipitation at cool down |
| N-Hydroxyethyl acrylamide | 7.5 g | 22.7 g | 0.06 g | at 55° C. yellow gel |
| Ethylene glycol vinyl ether | 7.5 g | 21.8 g | 0.06 g | no change |

Example 8

Polymerization of Various Monomers in the Presence of an Al$_2$O$_3$ Carrier

Several aqueous solutions, each with a different monomer, potassium persulfate and extrudates of Al$_2$O$_3$ (surface area, BET: 266 g/m$^2$), were prepared at a concentration of 0.24 g monomer/g Al$_2$O$_3$ and 0.012 g K$_2$S$_2$O$_8$/g Al$_2$O$_3$. The monomers are listed in Table 7. The resulting extrudates saturated with the aqueous monomer solutions were heated for 16 hours at 80° C. in a closed vessel. Next, the samples were kept at 120° C. in an open vessel for 1 hour to remove excess water. The carbon content of the thus obtained materials are reported in Table 7.

A support loaded with ethylene glycol vinyl ether, which does not polymerize in water (see Example 7) was prepared for comparison using the same preparation method. From the wt % carbon and C-yield for comparative run C4, it is clear that a significant amount of ethylene glycol vinyl ether was released upon heat treatment at 120° C. This shows that no or very incomplete polymerization occurred for ethylene glycol vinyl ether, and that this monomer had mostly evaporated during drying at 120° C.

TABLE 7

| Carrier | Monomer | Carbon | C-yield |
|---|---|---|---|
| D | Acrylic acid | 9.53 wt % | 100% |
| E | 2-Carboxyethyl acrylate | 8.17 wt % | 100% |
| F | Maleic acid | 7.08 wt % | 100% |
| G | N-Hydroxyethyl acrylamide | 9.77 wt % | 100% |
| C4 | Ethylene glycol vinyl ether | 2.79 wt % | 29% |

Example 9

Raman Measurements of Different Monomers on Al$_2$O$_3$ Supports

A carrier sample was prepared for comparative purposes. An extruded Al$_2$O$_3$ carrier as in Example 8 was saturated with an aqueous solution of acrylic acid at a concentration of 0.24 g monomer/g Al$_2$O$_3$ without KPS present. The extrudates, saturated with the aqueous monomer solution, were heated for 16 hours at 80° C. in a closed vessel. Next, the extrudates were kept at 120° C. in an open vessel for 1 hour to remove excess water. This was comparative sample C5.

Figure 2:
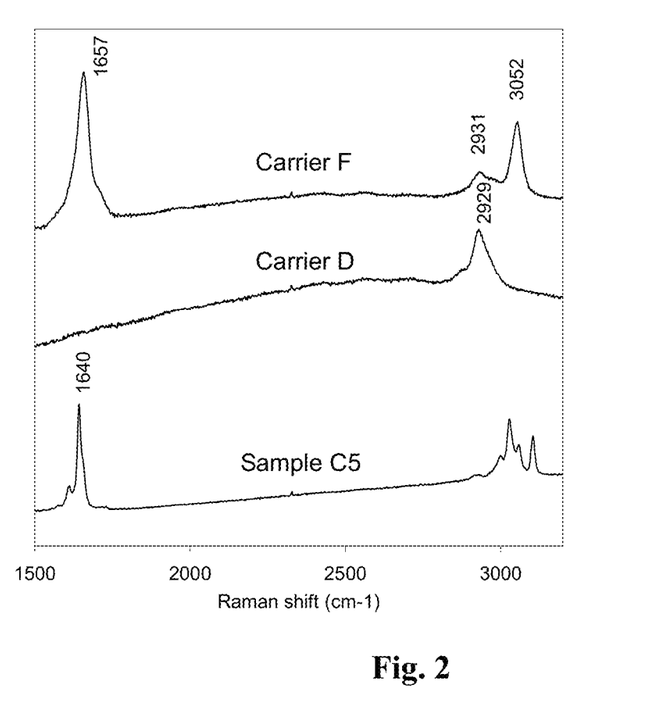
FIG. 2 shows Raman spectra providing evidence of polymerization in some of the samples prepared in Examples 8 and 9.
Figure 31:
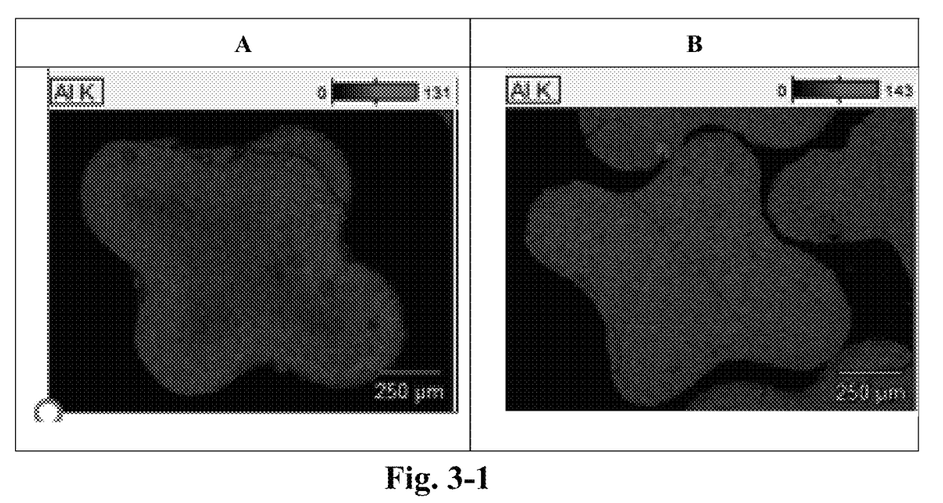

Raman spectra were recorded for comparative sample C5, and for Carrier D and Carrier F from Example 8 (Table 7); the Raman spectra are shown in FIG. 2. The Raman measurements were performed at 514 nm excitation; the laser power was controlled to avoid sample damage. The spectra were recorded with a 10×10 second acquisition time.

The spectrum of comparative sample C5 shows peaks characteristic of unreacted acrylic acid. The peak at 1640 cm$^{-1}$, which is associated with C=C stretch vibrations, is a clear sign that unreacted acrylic acid was present in comparative sample C5. The spectrum of Carrier D clearly shows that polymerization had occurred; the peak at 2929 cm$^{-1}$ is characteristic for polyacrylic acid. The absence of a peak at 1640 cm$^{-1}$ indicated that no C=C bonds were present in Carrier D. For a validation of the assignments of peaks characteristic of acrylic acid and polyacrylic acid, see for example, C. Murli and Y. Song, *Journal of Physical Chemistry B*, 2010, 114, 9744-9750. The spectrum of Carrier F shows bands that can be assigned to unreacted maleic acid and to polymaleic acid. The peak at 2931 cm$^{-1}$ indicates that a significant amount of polymaleic acid was present, while the peaks at 1657 cm$^{-1}$ and 3052 cm$^{-1}$ indicate the presence of unreacted C=C bonds in Carrier F. For a validation of the assignments of peaks characteristic of maleic acid and polymaleic acid, see for example, C. Q. Yang and X. Gu, *Journal of Applied Polymer Science*, 2001, 81, 223-228. Thus Carriers D and F, each of which had an initiator, contained a significant amount of polymer, while sample C5, which did not have an initiator, did not contain detectable amounts of polymer.

These experiments show that an appropriate initiator and/or conditions appear to be needed to polymerize monomers in the presence of carriers. In other words, the carrier by itself does not induce polymerization of the monomer(s).

Example 10

Preparation of Polymer-Modified Catalyst Containing Co and Mo

The materials prepared in Example 8 were loaded with metals by pore volume impregnation. A stock solution containing Mo at a concentration of 583 g $MoO_3$/L, Co at a concentration of 104 g CoO/L and $H_3PO_4$ at a concentration of 42 g $P_2O_5$/L was prepared by mixing $MoO_3$, $Co(OH)_X(CO_3)_Y$, and $H_3PO_4$ (aq., 85%), and water in appropriate amounts, and agitating and heating this mixture at 70° C. or above until a clear solution was obtained. As an additional comparative sample, the same stock solution and preparation method were used to prepare a catalyst starting from $Al_2O_3$ extrudates like those used in Example 8, but without any monomer. For each preparation, the stock solution was diluted with enough water so that the final catalyst samples each contained 28 wt % $MoO_3$, measured after calcination at 600° C.

Example 11

Activity Testing of Catalysts Containing Co and Mo

The catalysts prepared as described in Example 10 were ground; powder fractions of 125 to 350 µm were isolated by sieving. The 125 to 350 µm fractions were evaluated for their performance in hydrodesulfurization and hydrodenitrogenation. The catalysts were sulfided by contacting them with dimethyl disulfide (2.5 wt % S) spiked SR-LGO in a two-step process with a temperature hold for 8 hours at 250° C. and 5 hours at 320° C. just prior to running the test. The samples were tested at 45 bar (4.5×10$^6$ Pa) for their performance in hydrodesulfurization and hydrodenitrogenation with straight run gas oil (SRGO) of Feed B. Feed B contained 7914 ppm sulfur, 169 ppm of nitrogen, and had a density of 0.8574 g/mL; the boiling point distribution of Feed B is shown in Table 2. Catalyst activity was evaluated at a temperature of 350° C., while the $H_2$ to oil ratio was 300 NL/L, and the weight hourly space velocity (WHSV) was in the range of 2.5-3.5/hour. The actual weight of catalyst in the different reactors, the applied WHSV, and sulfur and nitrogen values in the liquid product samples are presented for the different catalysts in Table 8. S and N values were obtained by taking the average value of 4 liquid product samples obtained between 6 and 8 days after introduction of Feed B. The HDS order used was 1.4.

TABLE 8

| Run | Carrier* | Monomer | WHSV $g_{oil}/g_{cat}$/h | Test result S ppm | Test result N ppm | Activity $k_{wt,HDS}$ n = 1.4 | Activity $k_{wt,HDN}$ n = 1.0 |
|---|---|---|---|---|---|---|---|
| H | D | Acrylic acid | 3.10 | 31.1 | 6.5 | 1.75 | 10.1 |
| I | E | 2-Carboxyethyl acrylate | 2.85 | 18.1 | 3.8 | 2.04 | 10.8 |
| J | F | Maleic acid | 2.63 | 15.1 | 3.1 | 2.04 | 10.5 |
| K | G | N-Hydroxyethyl acrylamide | 2.71 | 15.8 | 3.0 | 2.06 | 10.9 |
| C6 | C4 | Ethylene glycol vinyl ether | 2.57 | 28.4 | 7.2 | 1.51 | 8.1 |
| C7 | $Al_2O_3$ | None | 2.74 | 50.6 | 24.6 | 1.24 | 5.3 |

*See Example 8 and Table 7.

There is a clear benefit in the HDS and HDN activity of catalysts H-K as compared to catalyst C7, to which no monomer was added, and catalyst C6, for which polymerization did not take place on the support. The results in the above Table show that introduction of a monomer to the carrier before introduction of the active metals is feasible, and that polymerization of the monomer provides the catalyst activity benefit.

Example 12—Comparative

A commercially applied CoMo/$Al_2O_3$ hydroprocessing catalyst having 24 wt % Mo as $MoO_3$, 4 wt % Co as CoO, and 2 wt % P as $P_2O_5$ was calcined to remove coke and convert the sulfides into oxides. The calcination temperature was high enough to remove all of the coke, but low enough to prevent substantial formation of bulk phases and $CoAl_2O_4$. This regenerated CoMo/$Al_2O_3$ catalyst was sample C8. To form sample C9, some of sample C8 was contacted with an aqueous solution of maleic acid. The aqueous maleic acid solution was applied via pore volume impregnation at a concentration of 0.10 g maleic acid per g catalyst. After impregnation, the material was left to stand for 3 hours at 50° C. in a closed vessel and afterwards heated to 120° C. in air to remove water. This maleic acid-contacted catalyst was sample C9. A Raman spectrum of sample C9 did not show peaks characteristic of polymaleic acid.

Example 13—Comparative

Activity Testing of Catalysts Containing Co and Mo without Polymer

Catalysts as described in Example 12 (samples C8 and C9) were ground; powder fractions of 125 to 350 µm were isolated by sieving. The 125 to 350 µm fractions were evaluated for their performance in hydrodesulfurization. The catalysts were sulfided by contacting them with dimethyl disulfide (2.5 wt % S) spiked SR-LGO in a two-step process with a temperature hold for 8 hours at 250° C. and 5 hours at 320° C. just prior to running the test. The samples were tested at 45 bar (4.5×10$^6$ Pa) for their performance in hydrodesulfurization with straight run gas oil (SRGO) of Feed C. Feed C contained 7914 ppm sulfur, 169 ppm of nitrogen, and had a density of 0.8574 g/mL; the boiling point distribution of Feed C is shown in Table 2. Catalyst activity was evaluated at a temperature of 350° C., while the $H_2$ to oil ratio was 300 NL/L, and the weight hourly space velocity (WHSV) was in the range of 2.5-3.5/hour. The actual weight of catalyst in the different reactors, the applied WHSV, and sulfur values in the liquid product samples are presented for the different catalysts in Table 9. S values were obtained by taking the average value of 4 liquid product samples obtained between 6 and 8 days after introduction of the SRGO. The IDS reaction order used was 1.4.

TABLE 9

| Run | Monomer | WHSV $g_{oil}/g_{cat}/h$ | Test result S ppm | Activity $k_{wt, HDS}$ n = 1.4 |
|---|---|---|---|---|
| C8 | none | 3.15 | 101 | 1.03 |
| C9 | Maleic acid | 3.27 | 107 | 1.04 |

Comparison of the results in Table 9 with those of Run J in Table 8 demonstrates two points. The first point demonstrated is that a hydroprocessing catalyst by itself (without a polymerization initiator) does not induce polymerization of a monomer species in the presence of the catalyst. The second point demonstrated is that the presence of an unpolymerized monomer does not appreciably increase the activity of the catalyst. Thus, an appropriate initiator and/or conditions are needed to ensure that polymerization of the monomer can take place.

Examples 14-15

The catalysts in Examples 14 and 15 were prepared in a manner similar to that described in Example 3 of the Specification: an impregnation solution containing cobalt, molybdenum, and phosphorus was prepared by mixing together cobalt carbonate ($Co(OH)_x(CO_3)_y$), $MoO_3$, $H_3PO_4$ (aq., 85%), and water in appropriate amounts. The mixture was heated at temperatures above 70° C. until a clear solution was obtained. No acrylic acid monomer was present in this solution. The solution was added to a quadrilobed-shaped alumina support via pore volume impregnation, and the resulting catalyst was subsequently dried. The catalysts contained 23.7 wt % $MoO_3$, 4.6 wt % CoO, and 2.0 wt % $P_2O_5$ on $Al_2O_3$. A portion of the catalyst was used in of the impregnation experiments in Examples 14 and 15.

Example 14

In this experiment, an aqueous solution containing acrylic acid and potassium persulfate was mixed with a portion of the catalyst prepared above. The flask containing the catalyst mixture was heated and dried as described in Example 3 above. The final catalyst was a free-flowing powder that was light brown in color.

Example 15—Comparative

An aqueous solution of polyacrylic acid was made and added to the CoMoP—$Al_2O_3$ catalyst. The polyacrylic acid had a molecular weight of 1800, and was obtained commercially from Sigma Aldrich Company. The target loading of polymer was 20 wt % with respect to the combined weight of $Al_2O_3+MoO_3+CoO+P_2O_5$ (excluding water). For example, 5.55 grams of catalyst with a water content of 10% corresponds to ~5 grams of catalyst excluding water; the target polymer loading for such a catalyst is 1 gram. The concentration of the aqueous solution containing 1 gram of polyacrylic acid was adjusted to result in a pore volume impregnation, i.e. to not overfill the pores. After addition of the aqueous polymer solution to the dry catalyst, the material was aged at 40° C. for 2 hours to make the material homogeneous, and then the catalyst was dried at 120° C. The final material was red in color, and the catalyst particles appeared to be glued together.

Both the monomer impregnated catalyst of Example 14 and the polymer-contacted catalyst of Example 15 were subjected to scanning electron microscopy energy-dispersive x-ray spectroscopy (SEM-EDX) to map the location of various elements in the catalyst particles. The catalysts were placed in a carbon matrix (embed resin) for these scans. Cross sections of the quadrilobed particles are shown in FIGS. 3-1 to 3-5.

In FIGS. 3-1 to 3-5, side-by-side comparisons of the SEM-EDX results are shown; the A column is for the monomer-impregnated catalyst of Example 14, and the B column is for the polymer-contacted catalyst of Example 15. The quadrilobed shape of the catalyst particles can be seen in the images for both catalysts. The polymer-contacted catalyst shows several particles close together because they are stuck together, while the monomer-impregnated catalyst particle is separate from other such particles. Because the support material is $Al_2O_3$, the aluminum signal is quite strong (FIG. 3-1). The carbon signals (FIG. 3-2) are quite strong around the particles because they are in a carbon matrix. The carbon cross section shows no signal from the monomer-impregnated catalyst particle (A) because the amount of carbon in the particle is much lower. The polymer-impregnated catalyst particles (B) show a lower carbon signal between the particles, indicating that there is no carbon matrix there, but instead something with a lower carbon concentration.

Figure 32:
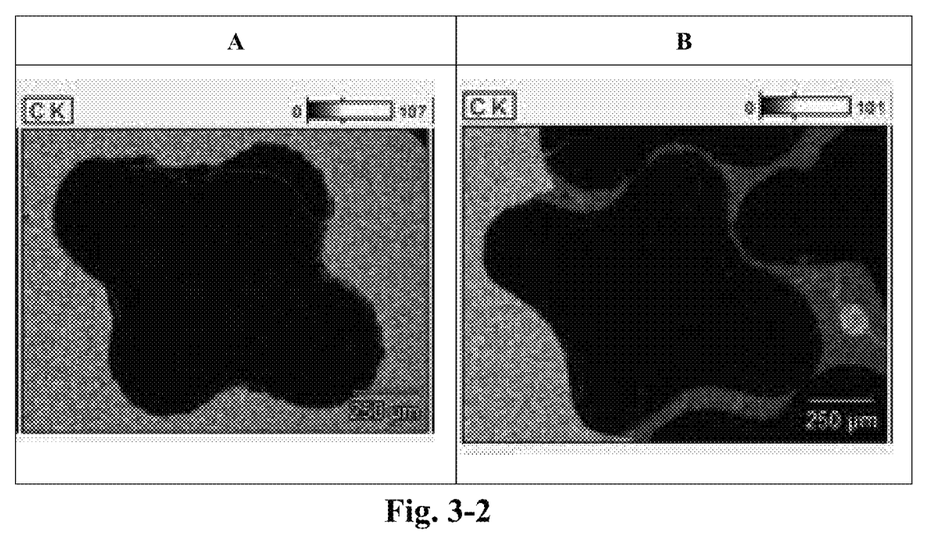
Figure 33:
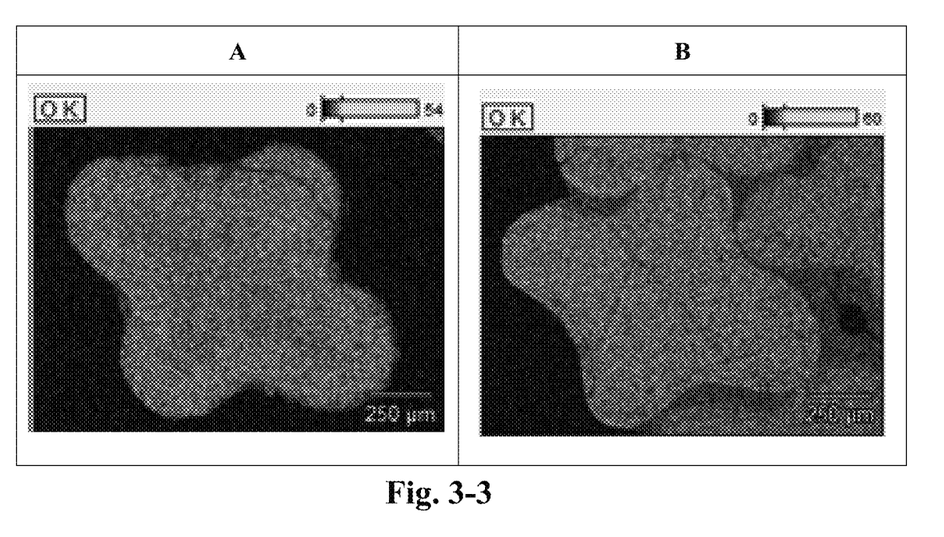

In FIG. 3-3, the oxygen signal in the monomer-impregnated catalyst particle is contained in the catalyst particle, indicating that all of the polymer formed from the monomers is contained within the catalyst particle. The oxygen signal of the polymer-impregnated particle (B) shows the presence of oxygen between the particles, approximately co-extensive with the area of dimming seen in the carbon cross-section in FIG. 3-2, indicating that polyacrylic acid is present outside of the catalyst particles.

Figure 34:
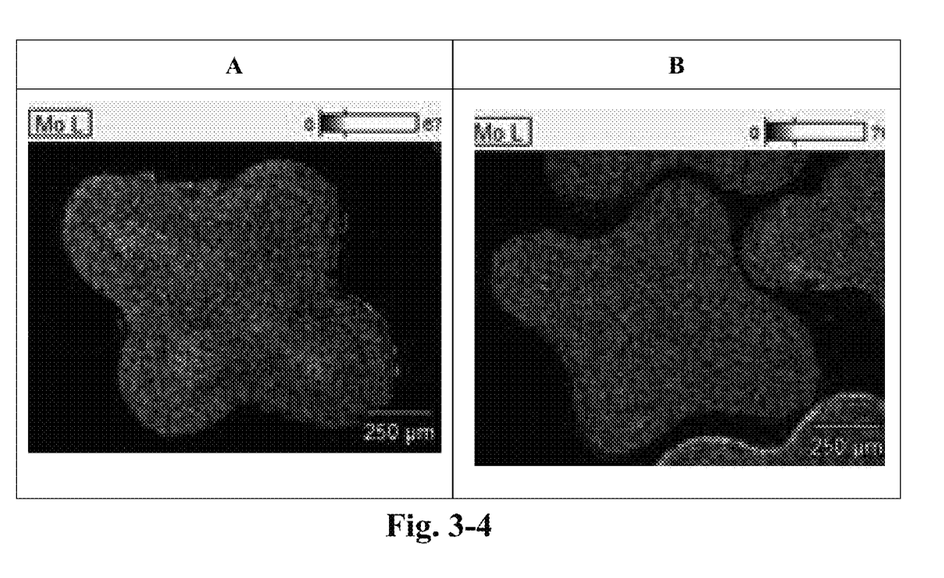
Figure 35:
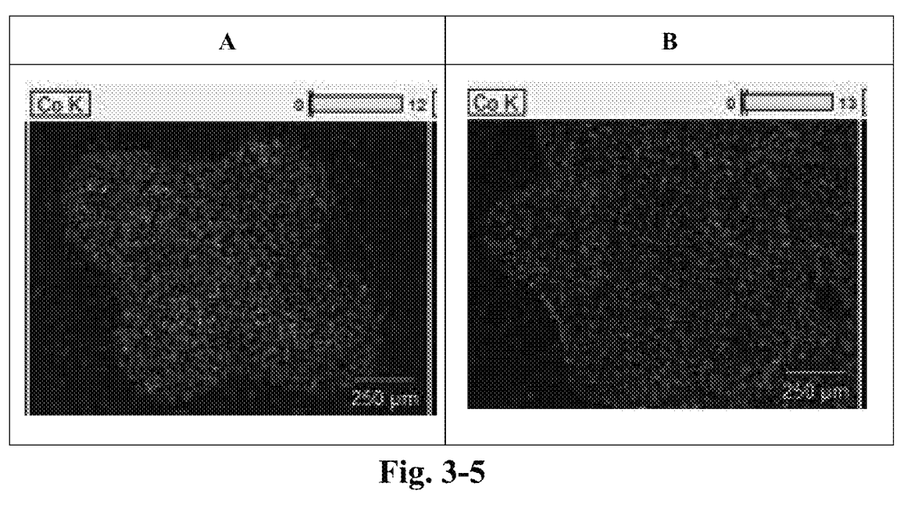

The molybdenum cross sections of the catalyst particles (FIG. 3-4) are fainter because the amount of molybdenum is low relative to the amounts of aluminum and oxygen, resulting in a lower signal-to-noise ratio. The cobalt cross sections (FIG. 3-5) have an even lower signal-to-noise ratio than the molybdenum cross sections because the amount of cobalt is lower than the amount of molybdenum. For the monomer-impregnated catalyst particle (A), the cobalt cross section is of the same shape as the cross sections for aluminum and carbon. The polymer-impregnated catalyst particles (B) have a relatively uniform cobalt signal, indicating that some of the cobalt migrated (leached) out into the polyacrylic acid that is outside of the catalyst particles. This migration of catalyst metals such as cobalt is generally undesirable, because homogenous distribution of the metals in the catalyst particle is preferred.

Examples 16-18

The catalysts in these runs were prepared using the one-step impregnation method described above, and polyacrylic acid was used instead of acrylic acid monomer to determine whether polyacrylic acid with very low molecular weight could be incorporated into the pore structure of $Al_2O_3$. In all three Examples, the $Al_2O_3$ support had a pore volume of 0.80 mL/g.

Example 16—Comparative

A polyacrylic acid (PAA) solution was made which upon pore volume impregnation of the $Al_2O_3$ support would result in a polymer concentration in the final catalyst of approximately 7 wt %. In 50 mL $H_2O$, 6.11 g of polyacrylic acid (mw 450; Sigma Aldrich) were dissolved ($c_{PAA}$=0.12 g/mL)

by adding the PAA slowly while stirring at a temperature of 40 to 50° C. After all of the PAA had dissolved, a viscous solution with a pH of 1.9 was obtained. The pH was increased to 5.3 by adding NaOH (which in effect resulted in the formation of Na polyacrylate). Upon addition of the NaOH, the solution became even more viscous. It became clear that PAA solutions in water are highly viscous even at low concentrations, regardless of the presence of sodium. The viscous solution (gel) was brought into contact with the $Al_2O_3$, which remained on top of the gel without any imbibition of the solution (gel) into the pores. As it became obvious that impregnation was not going to occur, the experiment was halted and not all of the $Al_2O_3$ was added to the solution (gel). Results are summarized in Table 13.

Example 17—Comparative

A PAA solution was made which upon pore volume impregnation of the $Al_2O_3$ support would result in a polymer concentration in the final catalyst of about 1 wt %. In 50 mL of distilled water, 1.0 g of PAA (mw 1250, Sigma Aldrich) was dissolved ($c_{PAA}$=0.02 g/mL) by adding the PAA while stirring at a temperature of about 50° C.; the solution immediately became viscous when PAA was added to the heated water. The solution (gel) was brought into contact with $Al_2O_3$, which remained on top of the gel without any imbibition of the solution (gel) into the pores. As it became obvious that impregnation was not going to occur, the experiment was halted and not all $Al_2O_3$ was added to the solution (gel). Results are summarized in Table 13.

Example 18—Comparative

Acrylic acid monomer was used in this experiment, and the concentration of acrylic acid, upon pore volume impregnation of the $Al_2O_3$ support, would result in a polymer concentration in the final catalyst of approximately 23 wt %, a much higher concentration than was used in Examples 16 and 17. In 50 mL of distilled water, 20.50 g acrylic acid and 0.50 g ammonium persulfate were dissolved ($c_{AA}$=0.41 g/mL). The ammonium persulfate was an initiator for the polymerization. This solution was not viscous. The monomer-containing solution was heated to a temperature of >80° C. to initiate the polymerization of acrylic acid to PAA. Upon polymerization, gel formation occurred rapidly, similar to the PAA solutions (gels) obtained in Examples 16 and 17. Results are summarized in Table 13.

TABLE 13

| Ex. | PAA mw | Expected amount PAA in catalyst | Result |
|---|---|---|---|
| 16 | 450 | 7 wt % | gel - no impregnation |
| 17 | 1250 | 1 wt % | gel - no impregnation |
| 18 | Before polym. | 23 wt % | soln. - impregnation possible |
|  | After polym. | 23 wt % | gel - no impregnation |

In Examples 16-18, the impregnations were pore volume impregnation or incipient wetness impregnation, in which, as noted above, the impregnation solution will be taken up virtually completely by the pores of the catalyst support. If impregnation had worked in Examples 16-18, all of the solution would have gone into the pores. The fact that the solutions remained indicates that there was minimal or no uptake of polymer into the pores of the $Al_2O_3$ support.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

That which is claimed is:

1. A process for forming a supported catalyst, which process comprises
   I) bringing together components in any of the following combinations:
      a-i) a carrier, one or more monomer species, a polar solvent, and optionally an initiator,
      b-i) a carrier, one or more monomer species, at least one phosphorus compound, at least one Group VIB metal compound, and at least one Group VIII metal compound, and optionally an initiator, or c-i) a carrier and an impregnation solution, forming an impregnated carrier, followed by mixing the impregnated carrier with one or more monomer species and optionally an initiator, to form a monomer-containing mixture, where said monomer species is soluble in the polar solvent and has carbon-carbon unsaturation and at least one functional group comprising at least one heteroatom; and II) polymerizing at least a portion of said monomer species in the monomer-containing mixture to form a polymerized product;

III) when I) does not include at least one phosphorus compound, at least one Group VIB metal compound, and at least one Group VIII metal compound, either a-iia) contacting an impregnation solution and the monomer-containing mixture during the polymerizing in II), or a-iib) contacting the polymerized product and an impregnation solution;

to form a supported catalyst, where the molar ratio of phosphorus to Group VIB metal is about 1:1.5 to less than about 1:12, where the molar ratio of the Group VIB metal to the Group VIII metal is about 1:1 to about 5:1, where said impregnation solution comprises a polar solvent, phosphorus, at least one Group VIB metal, and at least one Group VIII metal, where a polymer is formed during the polymerizing and the polymer has a carbon backbone, and comprises functional groups having at least one heteroatom, and the polymer loading is about 1.5 wt % or more, relative to the total weight of the other components in the catalyst.

2. A process as in claim 1 further comprising removing excess solvent from the supported catalyst and/or further comprising sulfiding the catalyst.

3. A process as in claim 2 wherein the polymerizing is carried out during the removal of excess solvent.

4. A process as in claim 2 wherein said removing is such that 50% or more of the polymer remains in the catalyst after said removing.

5. A process as in claim 1 wherein a single impregnation step is carried out in III).

6. A process as in claim 1 wherein a carrier, one or more monomer species, at least one phosphorus compound, at least one Group VIB metal compound, and at least one Group VIII metal compound are brought together in I).

7. A process as in claim 6 wherein said polar solvent is water; wherein said phosphorus compound is a water soluble acidic phosphorus compound; wherein said Group VIB metal compound is an oxide or an oxo-acid; and/or wherein said Group VIII metal compound is a carbonate, hydroxide, or hydroxy-carbonate.

8. A process as in claim 7 wherein said Group VIB metal compound is a molybdenum compound and/or a tungsten compound, and/or wherein said Group VIII compound is a nickel and/or cobalt compound.

9. A process as in claim 1 wherein the heteroatom of the functional group of the monomer species is nitrogen, oxygen, phosphorus, or sulfur; wherein said carrier is silica, alumina, silica-alumina, alumina with silica-alumina dispersed therein, alumina-coated silica, or silica-coated alumina; and/or wherein the molar ratio of phosphorus to Group VIB metal is about 1:2.5 to less than about 1:12.

10. A process as in claim 1 wherein the functional group of the monomer species is carboxylic acid group, an ester group, or an amido group.

11. A process as in claim 1 wherein the monomer species is maleic acid, fumaric acid, acrylic acid, 2-carboxyethyl acrylate, or N-hydroxyethyl acrylamide.

12. A process as in claim 1 wherein the carrier has been calcined and/or extruded prior to step I) of the process.

* * * * *